US00RE36508E

United States Patent [19]

Gornati et al.

[11] E Patent Number: Re. 36,508

[45] Reissued Date of Patent: Jan. 18, 2000

[54] METHOD OF AUTOMATICALLY MEASURING THE HORIZONTAL SCAN FREQUENCY OF A COMPOSITE SYNCHRONISM SIGNAL, AND AN ELECTRONIC CIRCUIT OPERATING IN ACCORDANCE WITH THE METHOD

[75] Inventors: Silvano Gornati; Giorgio Betti, both of Milan; Fabrizio Sacchi; Gianfranco Vai, both of Pavia; Maurizio Zuffada, Milan, all of Italy

[73] Assignee: SGS-Thomson Microelectronics S.r.l., Agrate, Italy

[21] Appl. No.: 08/932,000

[22] Filed: Sep. 17, 1997

Related U.S. Patent Documents

Reissue of:

[64] Patent No.: 5,134,481
Issued: Jul. 28, 1992
Appl. No.: 07/631,915
Filed: Dec. 21, 1990

U.S. Applications:

[63] Continuation of application No. 08/282,844, Jul. 28, 1994, abandoned.

[30] Foreign Application Priority Data

Dec. 21, 1989 [IT] Italy ..... 22782-A/89

[51] Int. Cl.[7] ..... H04N 5/08; H04N 5/04; H04N 7/01

[52] U.S. Cl. ..... 348/558; 348/531; 348/194

[58] Field of Search ..... 348/531, 558, 348/525, 526, 194, 180, 505, 506, 507, 508, 500, 540, 542, 441, 604; H04N 5/08, 5/04, 7/01

[56] References Cited

U.S. PATENT DOCUMENTS

| | | | |
|---|---|---|---|
| 4,353,091 | 10/1982 | Hoppe | 348/194 |
| 4,402,011 | 8/1983 | Newton . | |
| 4,561,021 | 12/1985 | Abe . | |
| 4,672,449 | 6/1987 | Kraus et al. | 348/194 |
| 4,675,734 | 6/1987 | Widom . | |
| 4,769,704 | 9/1988 | Hirai et al. . | |
| 4,792,852 | 12/1988 | Narusawa . | |
| 4,812,906 | 3/1989 | Wölber . | |
| 4,954,893 | 9/1990 | Urakami . | |
| 4,999,708 | 3/1991 | Aoki et al. . | |
| 5,003,392 | 3/1991 | Wischermann . | |

FOREIGN PATENT DOCUMENTS

| | | |
|---|---|---|
| 2431825 | 2/1974 | Germany . |
| 3021417 | 6/1980 | Germany . |

*Primary Examiner*—Victor R. Kostak
*Attorney, Agent, or Firm*—Theodore E. Galanthay; Lisa K. Jorgenson

[57] ABSTRACT

A method of automatically measuring the horizontal scan frequency of a composite synchronism signal, comprising horizontal synchronization impulses at line frequency, consists of first performing a count of a number of impulses having a repeat frequency higher than said line frequency, as intervening between two successive impulses at line frequency.

The count value, corresponding to said number of impulses, is stored to obtain the line frequency of the signal, and thereafter, a series of down counts is effected, as initiated at predetermined times, until a change of frequency of the signal is detected.

18 Claims, 3 Drawing Sheets

METHOD OF AUTOMATICALLY MEASURING THE HORIZONTAL SCAN FREQUENCY OF A COMPOSITE SYNCHRONISM SIGNAL, AND AN ELECTRONIC CIRCUIT OPERATING IN ACCORDANCE WITH THE METHOD

Matter enclosed in heavy brackets [ ] appears in the original patent but forms no part of this reissue specification; matter printed in italics indicates the additions made by reissue.

*This application is a continuation of application Ser. No. 08/282,844 filed on Jul. 28, 1994, now abandoned, which is a reissue of Ser. No. 07/631,915 filed on Dec. 21, 1990 now U.S. Pat. No. 5,134,481.*

DESCRIPTION

This invention relates to a method of automatically measuring the horizontal scan frequency of a composite synchronism signal.

The invention relates, moreover, to an electronic circuit operating in accordance with the above method.

BACKGROUND OF INVENTION

No unique broadcasting and/or operating standard is currently available as relates to composite synchronism video signals.

As a result, for proper operation of video sets, the latter must be equipped with devices which [be] *are* capable of detecting in an automatic manner the type of the input signal, or more specifically, the repeat frequency fh of the video picture line, which is representative of the broadcasting standard.

For instance with monitors, the composite synchronism video signal contains n impulses at the horizontal line frequency fh, followed by a single impulse at the vertical frequency fv, the duration whereof is equal to a multiple n' of the duration of the line frequency impulses and tied to the broadcasting standard being used.

The prior art has indeed proposed a solution to the problem of finding the line frequency fh.

This prior solution consists of providing a counter, having a predetermined scan frequency fc higher than the line frequency fh, and of detecting the number of count impulses occurring between two successive impulses at line frequency.

By comparison of two chronologically successive measurements it becomes possible to decide whether a frequency change did occur.

However, this prior solution cannot prevent the measurement from being affected by the presence of vertical synchronization impulses.

SUMMARY OF INVENTION

The underlying technical problem of this invention is to provide a method of automatically measuring the horizontal scan frequency of a composite synchronism signal, which has such functional characteristics as to make the measurement unaffected by the presence of vertical frequency raster synchronisms and by any missed line frequency impulse due to occasional or temporary malfunctions.

This problem is solved by a method as indicated being characterized in that it comprises the following steps:

effecting a count of a number of impulses, which impulses have a repeat frequency higher than said line frequency, intervening between two successive, line frequency impulses;

storing the count value, corresponding to said number of impulses, to obtain the line frequency; and effecting successive checking counts, in the reverse order, until a change of frequency of the composite synchronism signal is detected.

This technical problem is also solved by an electronic circuit for automatically measuring the horizontal scan frequency of a composite synchronism signal comprising horizontal synchronization impulses at line frequency and at least one synchronization impulse at vertical frequency, characterized in that it comprises:

a timer receiving on its input said synchronization signal and a clock signal having a predetermined repeat frequency higher than said line frequency;

a counter connected downstream from the timer to detect the number of the impulses at the clock frequency between two successive impulses at line frequency;

a memory connected two-directionally to the counter for storing said number of impulses; and a control logic having inputs connected to outputs of the timer and the counter, and outputs connected to respective inputs of the counter and the memory to enable up or down counting and the storing of said number based upon timing signals from the timer.

The features and advantages of the method and the circuit according to the invention will become apparent from the following detailed description of embodiments thereof, to be taken by way of illustration and not of limitation with reference to the accompanying drawings.

DETAILED DESCRIPTION OF PREFERRED EMBODIMENT

Figure 1:
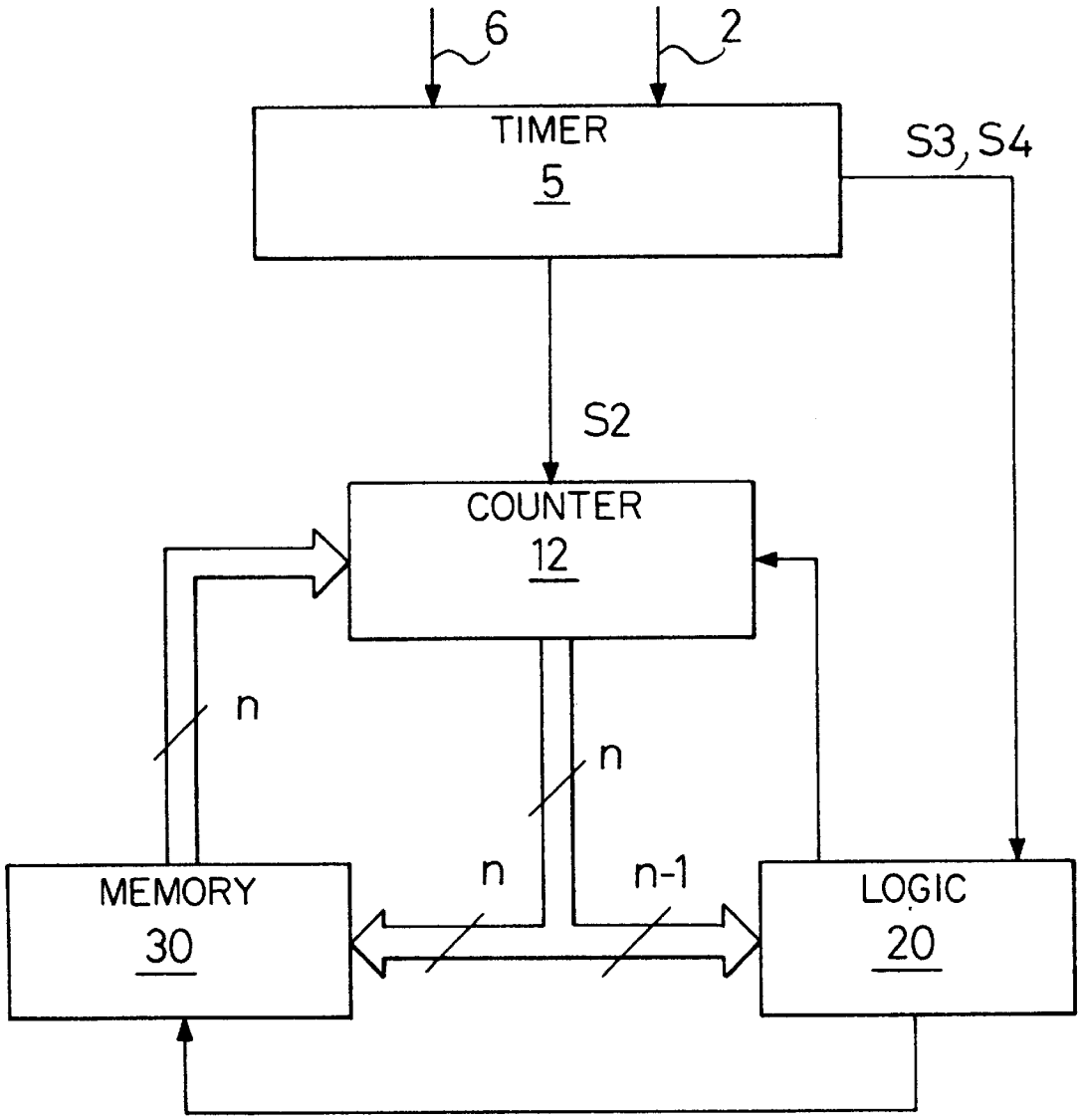
FIG. 1 is a block diagram depicting schematically the electronic circuit of this invention.
Figure 2:
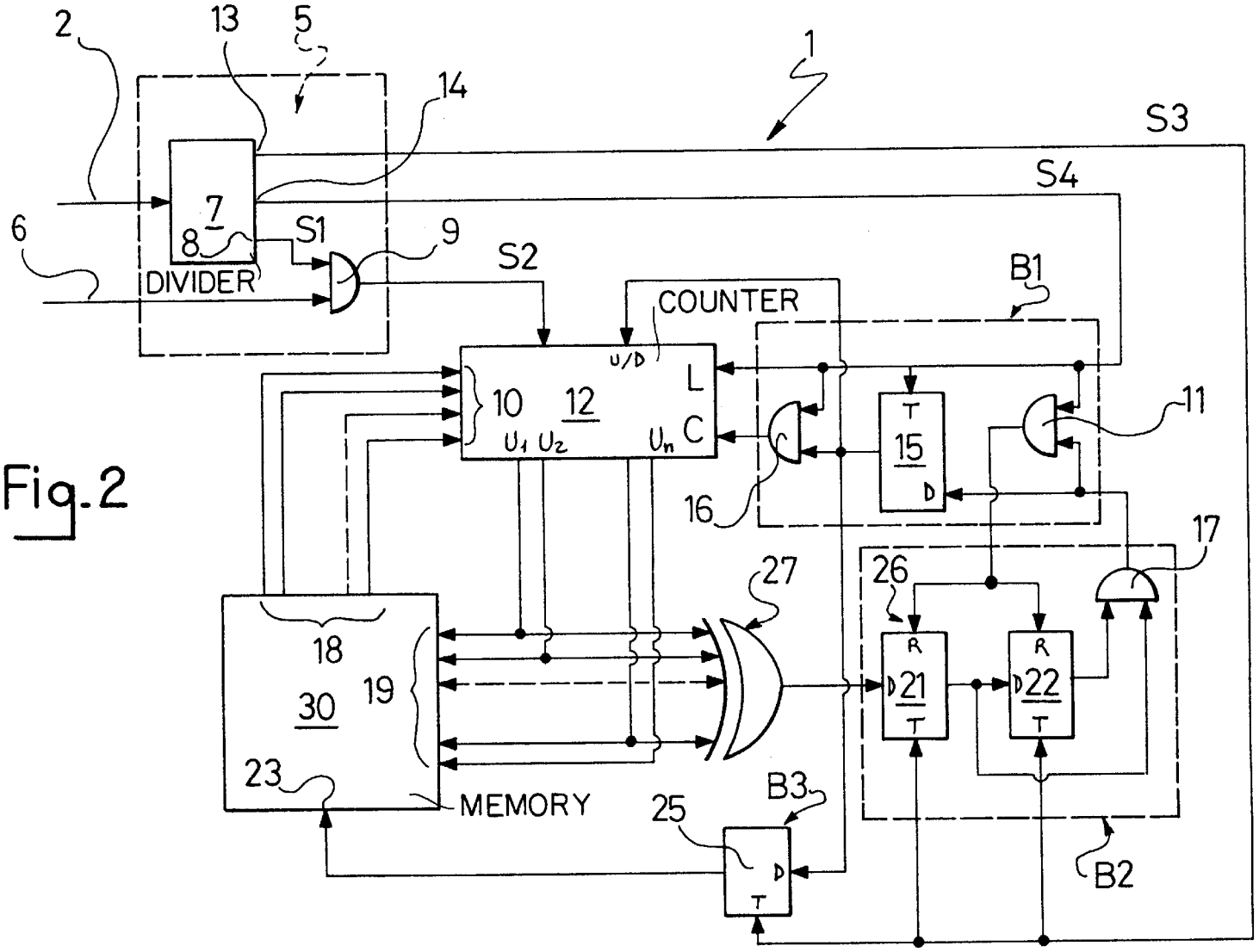
FIG. 2 is a detailed diagram of the same circuit as in FIG. 1.

With reference to the drawing figures, generally and schematically indicated at 1 is an electronic circuit adapted to automatically measure the horizontal scan frequency of a composite synchronism video signal 2 from a generic video source, not shown because conventional.

The signal 2 comprises a first series of m synchronization impulses 3 at line horizontal frequency fh, followed by a vertical synchronization impulse 4 having a different frequency fv.

The composite synchronism signal 2 is input to a timer 5. A second input of the timer 5 is to receive a clock signal 6 having a predetermined scan frequency fc higher than the line frequency fh, e.g. from a quartz oscillator.

Specifically, the timer 5 incorporates a divider 7 which receives on its input the synchronization signal 2 and performs division of said signal by six.

Figure 3:
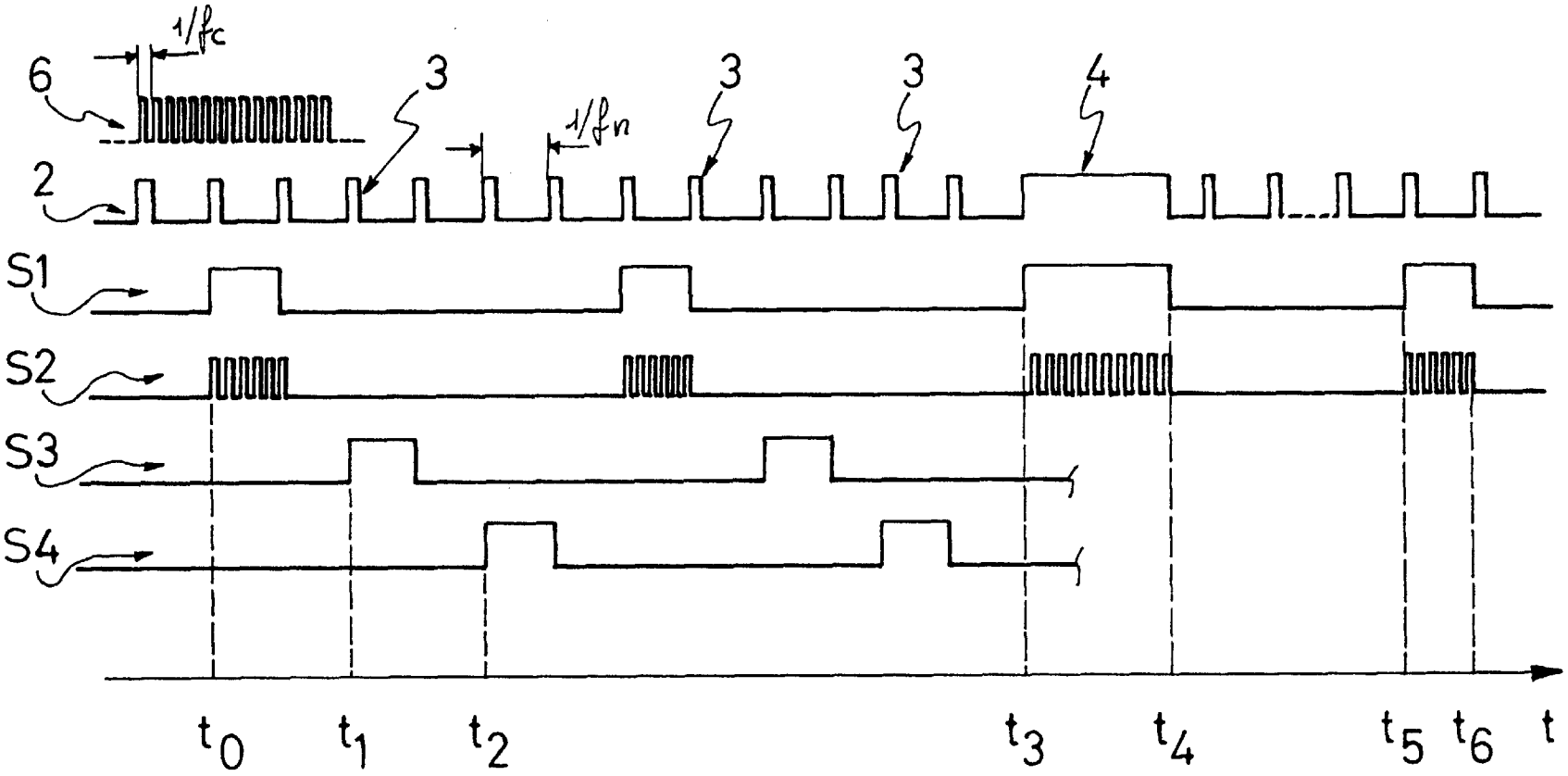
FIG. 3 shows a series of signals having the same time base, present in the circuit of FIG. 1.

The divider 7 issues on an output 8 a signal s1 which has the pattern shown in FIG. 3 and corresponds to a step impulse with a duration of 1/fh every six impulses 3 at line frequency. The output 8 is connected directly to one input of a logic AND gate 9 receiving, on another input, the clock signal 6 and outputting a signal s2 which corresponds to a first count of those impulses at clock frequency fc which occur between two successive impulses 3 at line frequency.

The output of said AND gate 9 is connected to an input of a counter 12 of the up/down type, i.e. capable of counting in either the "up" or "down" directions.

The "count-up" or "count-down" operating condition of the counter 12 will be determined by [a] control logic 20 whereto a pair of signals s3 and s4 are input from respective outputs 13 and 14 of the divider 7.

This control logic 20 is composed of certain circuit portions or blocks to be described in detail herein below. A first block B1 comprises a pair of logic gates 11 and 16 of the AND type and a bistable memory cell 15 of the delay type.

The output 14 is connected to a corresponding input of each gate, 11 and 16, as well as to the clock input T of the cell 15 and a load input L of the counter 12.

The cell 15 has an output connected directly to another input of the gate 16 which has the output connected to a reset input C of the counter 12. The output of the cell 15 is also connected to a further UP/DOWN input of the counter 12 to set the operating condition of the counter 12, and the data input D of a bistable cell 25, of the D type, which forms a third block B3 of the logic 20.

This logic 20 comprises a second block B2 including a shift register 26, composed of a pair of bistable cells 21 and 22, and a logic gate 17 of the AND type. The cells 21 and 22 are of the so-called D type with a data input D, reset input R, and clock input T.

The output 13 of the divider 7 is connected directly to both clock inputs T of the cells 21 and 22 and to the clock input T of the cell 25 of block B3.

The cell 21 has its output connected directly to the data input D of the cell 22. Each cell 21 and 22, moreover, has its respective output connected directly to a corresponding input of the logic gate 17.

The interaction of the blocks B1 and B2 described in the foregoing is provided by the links of the output of the gate 17 of block 2 to one input of the gate 11 and the data input D of the cell 15.

In addition, the output of the gate 11 is connected directly to both reset inputs R of the cells 21 and 22.

The logic 20 further comprises a fourth block 27 made up of an exclusive OR logic gate EXOR having a single output connected to the data input D of the cell 21 and a plurality of inputs.

The structure of the circuit 1 is completed by a memory 30 connected two-directionally to the counter 12.

In particular, the counter 12 has a plurality of outputs, denoted by the references U1 to Un, which are connected to respective inputs 19 of the memory 30, the latter having outputs 18 which are connected to respective inputs 10 of the counter. The first n-1 outputs of the counter are also connected to respective inputs of the gate 27 except, of course, output Un.

In addition, the output of the bistable cell 25 in block B3 is connected to an enable input 23 of the memory 30.

The measuring method of this invention, to be implemented by the electronic circuit 1 just described, consists of the following steps.

At the initial time to, a count of the number of the impulses at clock frequency fc is effected which occur between two successive line impulses at frequency fh. The counter 12 will provide the count of such impulses, it being set in the "up" operating condition by the block B1 of the logics 20.

This first count, from 0 to a value m, results in the value of the line frequency fh being found, with the clock frequency fc being a known factor. This value m is stored in the memory 30 at the time t1 on the basis of signal s3.

Subsequently to storing the value m corresponding to the frequency fh into the memory 30, the counter 12 is set by the block B1 to the "down" operating condition and initialized to count from the value m down to 0.

At the time t2, the counter 12 is initialized on the basis of the synchronization signal s4, loading into it the value m present in the memory 30 following reception of an enable impulse on the input L.

From now on, at each successive count interval, it will be necessary to check that the contents of the counter 12 has returned to the value 0.

This check is carried out by the EXOR gate 27 on the n-1 most meaningful bits of the counter 12; that is, the least meaningful bit present on the output Un is neglected.

Advantageously, the provision of the gate 27 allows any error by ± one impulse in the down count to be corrected.

In fact, since the composite synchronism signal and the clock signal at the frequency fc are not synchronized with each other, it may occur that a different number of impulses be considered at subsequent count intervals. In other words, it might happen that at the end of the down count, the counter 12 has counted one impulse more or one impulse less.

Advantageously, the gate 27 provided allows the return to 0 of the counter to be checked irrespective of this possible error situation.

The portion B2 of the logics 20 is instead effective to detect the change of frequency in the composite synchronism video signal. When, at the end of the series of n impulses at line frequency fh, the impulse 4 at vertical frequency fv arrives, the shift register 26 consisting of the cells 21 and 22 can detect the change of frequency because a fresh down count has been started at the time t3.

Understandably, the counter 12 should be adequately sized; that is, if N is the number of the impulses at the clock frequency fc which occur within a vertical impulse of maximum duration, it shall have to be the logarithm to base 2 of N, as rounded off to the upper integer.

Where the count interval coincides with the duration of the vertical impulse, at the time t4, the contents of the counter 12 will be other than 0. However, the contents of the memory 30 which still contains the value m, will not be changed.

The portion B2 of the logics 20 will then check at the time t6 that the signal corresponding to the change in frequency at the time t4 was due to the vertical impulse 4. This because of the composite signal being restored to a pulsive pattern at the line frequency fh. At the end of this further count interval in the "down" mode, the contents of the counter 12 will be back to the value 0 and the logics 20 will ignore the frequency change information received at the end of the previous count interval.

In other words, the output of the AND gate 17 will be only switched to a logic high where two successive returns to a value other than 0 are detected in the countdown performed by the counter 12; return to a value other than 0 would be indicated by the output of the gate 27 being at a high.

Advantageously, the circuit of this invention automatically detects the line frequency of the composite video signal even without an impulse at frequency fh.

Even in the most unlikely event that the missing impulse, at the frequency fh, is the one that should appear after a vertical impulse and after a number of impulses equal to the selected timing, the block B2 would detect a frequency change which actually did not occur.

Likewise, where the missing impulse, at the frequency fh, is the one that should appear before the vertical impulse and before a number of impulses equal to the selected timing, the block B2 would detect a frequency change which actually did not occur.

In this case, the counter 12 would be set for the "up" mode in order to measure the new frequency, but the number of the impulses at the clock frequency fc to be counted would be exactly the same as that measured at the time to. Consequently, the bistable cell 15 in the block B3 would update the memory with a value already there.

Where an impulse is missing instead at any other position of the signal 2, the information on the occurrence of a frequency change would not be confirmed, and accordingly, such a missed impulse would be uninfluential.

We claim:

1. Method of automatically measuring the broadcasting standard of a composite synchronism video signal comprising synchronization impulses at horizontal line frequency, characterized in that it comprises the following steps:

effecting a count of a number of impulses, which impulses have a repeat frequency higher than said line frequency, intervening between two successive, line frequency impulses to produce a count value representative of the line frequency;

storing the said count value, corresponding to said number of impulses, to obtain the line frequency; and effecting successive check counts, [int he] *in the* reverse order, of the same said impulses between subsequent line frequency impulses until a change of frequency of the composite synchronism signal is detected.

2. An electronic circuit for automatically measuring the horizontal synchronization frequency of a composite synchronism signal comprising horizontal synchronization impulses at a line frequency and at least one synchronization impulse at vertical frequency, characterized in that it comprises:

a timer receiving on its input said synchronization signal and a clock signal having a predetermined repeat frequency higher than said line frequency;

a counter connected downstream from the timer to detect the number of the impulses at clock frequency between two successive impulses at line frequency, said number of impulses being representative of the line frequency;

a memory connected two-directionally to the counter for storing said number of impulses; and control logic having inputs connected to outputs of said timer and said counter, and outputs connected to respective inputs of the counter and the memory to enable up or down counting and storing based upon timing signals from the timer.

3. A circuit according to claim 2, characterized in that said control logic comprises a circuit portion for detecting the change of frequency in said composite synchronism signal.

4. A circuit according to claim 2, characterized in that said control logic comprises a circuit portion effective to enable the counter to perform said up or down counting.

5. A circuit according to claim 3, characterized in that said control logic comprises a logic gate of the exclusive OR type having an output connected to said circuit portion and a plurality of inputs connected directly to respective outputs of the counter to check that the down count by said counter has actually gone back to zero.

6. A circuit according to claim 3, characterized in that said circuit portion comprises a shift register and a logic gate connected downstream from said register.

7. A circuit according to claim 2, characterized in that said timer comprises a frequency divider whereto said synchronization signal is input directly and which has an output connected to the input side of a logic gate receiving on another input said clock signal.

8. A circuit according to claim 5, characterized in that said gate of the exclusive OR type carries out a check on a predetermined number of most meaningful bits of the counter.

9. A circuit according to claim 5, characterized in that said gate of the exclusive OR type carries out a check on the n-1 most meaningful bits of the counter.

*10. A method for measuring the horizontal scan frequency of a composite synchronism signal, comprising the steps of:*

*(a) initially measuring the duration between adjacent synchronization pulses, to obtain a stored value therefrom; and thereafter*

*(b) intermittently comparing the duration between adjacent synchronization pulses to said stored value, to ascertain whether the duration between adjacent synchronization pulses is significantly different from said stored value; and*

*(c) repeating said step (b) intermittently, until said step (b) indicates, for a predetermined plurality of repetitions, that the duration between adjacent synchronization pulses is significantly different from said stored value, and then initiating a resynchronization process and performing said step (a).*

*11. The method of claim 10, wherein said step (a) of measuring consists of counting clock pulses.*

*12. The method of claim 10, wherein said step (b) of intermittently comparing is performed periodically.*

*13. The method of claim 10, wherein said step (b) of comparing is performed at regular intervals of a predetermined number of lines.*

*14. The method of claim 10, wherein said step (b) of comparing ignores at least one least-significant bit position.*

*15. A circuit for measuring the horizontal scan frequency of a composite synchronism signal, comprising:*

*input circuitry connected to receive the composite synchronism signal and a clock signal, and to generate therefrom*

*a first output which repeatedly, at intervals determined by a count of said pulses of the composite synchronism signal, provides a burst of clock pulses corresponding to the separation between adjacent pulses in the composite synchronism signal, and*

*at least a first additional output which repeatedly, at intervals determined by a count of said pulses of the composite synchronism signal, provides a pulse after the end of said burst of clock pulses on said first output;*

*an up/down counter;*

*a memory connected to controllably transfer data to and receive data from said counter; and*

*logic circuitry connected to control transfer of data to and from said memory, and to control an up/down input of said counter, and to detect when said counter has a count value of approximately zero;*

*said logic circuitry being configured*

*to initially operate said counter in a first up/down direction to count pulses in one of said bursts, and thereafter*

*to transfer an initial count value from said counter into said memory, and thereafter,*

*on each occurrence of a pulse on said first additional output, to cause said counter to operate in a second up/down direction starting from said initial count value, and then to detect whether said counter reaches a count value of approximately zero;*

*said logic circuitry returning said counter to operation in said first up/down direction whenever said logic circuitry twice successively detects that said counter, while operating in a second up/down direction starting from said initial count value, has not reached a count value of approximately zero.*

*16. The circuit of claim 15, wherein said input circuitry is a timer.*

*17. The circuit of claim 15, wherein said logic circuitry, in detecting said counter has a count value of approximately zero, ignores at least one least-significant bit of the count value.*

*18. The circuit of claim 15, wherein said input circuitry timer further comprises a second additional output which repeatedly, at intervals determined by a count of said pulses of the composite synchronism signal, provides a pulse after the end of said burst of clock pulses on said first output and prior to said pulse on said first additional output.*

* * * * *